Patented Aug. 19, 1947

2,425,804

UNITED STATES PATENT OFFICE 2,425,804

SOAPSTONE CRAYON AND METHOD OF MAKING SAME

Arthur M. Hossenlopp, Metuchen, N. J., assignor to Henry L. Crowley & Company, Inc., West Orange, N. J., a corporation of New Jersey No Drawing. Application March 8, 1945, Serial No. 581,722

2 Claims. (Cl. 260—9)

This invention relates to crayons particularly adapted for use in marking articles to be subjected to high temperatures and a method of making these crayons.

The full nature and objects of the crayon of this invention will be apparent from the following description of the nature thereof and the methods of compounding it.

This invention resides in the article and the methods of making the same, all as hereinafter clearly described.

There has been available to industry no suitable synthetic crayon which will satisfactorily mark articles which, during processing, are subjected to very high temperatures. For example, industry frequently finds it necessary to apply identification data to objects such as billets or ingots of steel, which marks must, if they are to serve their intended purpose, remain legible after such heat treatment. For example, billets or ingots of steel are identified by means of marks which are frequently obliterated during the heat treatment thereof, when made by the use of crayons now available.

It is a general object of this invention to provide a crayon in the form of a soapstone body suitable for this purpose.

In accordance with this invention, the crayon body comprises a mixture of talc or soapstone, clay, corn flour, polyvinyl alcohol and water. The proportions of these ingredients is not critical, but I have found that a mixture comprising the following ingredients is of particular value to my invention.

Table I

| | Parts by weight |
|---|---|
| Kentucky ball clay | 10 |
| Talc | 90 |
| Corn flour | 5 |
| Polyvinyl alcohol | 2 |
| Water (this is a temporary addition to provide the necessary workability and is subsequently removed by drying before using the crayon) | 20 |

It has been found possible to vary the composition of this crayon within the following limits:

Table II

| | Parts by weight |
|---|---|
| Kentucky ball clay | 5 to 15 |
| Talc | 85 to 95 |
| Corn flour | 2 to 7 |
| Polyvinyl alcohol | 1 to 3 |
| Water | 18 to 22 |

The composition, of course, must be balanced to include all of the ingredients and workability must be such that it may be fabricated in a satisfactory manner.

In addition to the above ingredients, I have found that in certain situations where exceedingly good marking ability is needed, 5 to 15 parts of precipitated titanium dioxide may be substituted for an equal weight of talc.

A thorough mixture of the ingredients is molded into the desired shape in any suitable way, as for example, pressing, extruding, or casting. It will be understood by one skilled in the art that the water content must be adjusted for the particular forming operation under consideration. The composition described applies, in respect to the water content, to the utilization of an extruding machine. After forming in any one of the convenient methods, the body is dried at some temperature above the boiling point of water and below the decomposition temperature of the polyvinyl alcohol until the moisture content is lowered to the desirable amount for storage.

The particular forms of talc and clay used are not critical since they appear to have little effect upon the desired characteristics of the crayon and they are, therefore, selected with an eye to their extruding or pressing properties rather than to their effect on the crayon as a marking instrument.

It will be apparent from the above disclosure that the subject matter of this invention is capable of variations within the scope indicated and I do not, therefore, desired to be limited except by the scope of the appended claims.

What is claimed is:

1. A high temperature resisting crayon comprising a self-sustaining body composed of a mixture including clay, talc, corn flour and polyvinyl alcohol, in which the ingredients are present in the following proportions by weight, clay 10 parts, talc 90 parts, corn flour 5 parts and polyvinyl alcohol 2 parts.

2. A high temperature resisting crayon comprising a self-sustaining body composed of a mixture of ingredients in the following range of proportions by weight, clay 5 to 15 parts, talc 85 to 95 parts, corn flour 2 to 7 parts, and polyvinyl alcohol 1 to 3 parts.

ARTHUR M. HOSSENLOPP.

REFERENCES CITED

The following references are of record in the file of this patent:

UNITED STATES PATENTS

| Number | Name | Date |
|---|---|---|
| 1,561,075 | Hauff | Nov. 10, 1925 |
| 2,256,853 | Schwartz | Sept. 23, 1941 |
| 2,380,126 | Sturm | July 10, 1945 |

FOREIGN PATENTS

| Number | Country | Date |
|---|---|---|
| 466,847 | Great Britain | 1937 |